United States Patent [19]

Zhivotov et al.

[11] 4,295,387

[45] Oct. 20, 1981

[54] APPARATUS FOR BALANCING BODIES OF REVOLUTION

[76] Inventors: Jury G. Zhivotov, ulitsa Svobody, 4, kv. 148; Igor I. Kupchinsky, ulitsa Kuibysheva, 4, kv. 3; Vyacheslav D. Plokhuta, ulitsa Dzerzhinskogo, 33-a, kv. 7; Alexandr M. Bezverkhny, ulitsa Titova, 30, kv. 76, all of Dnepropetrovsk, U.S.S.R.; Samoil I. Nabutovsky, deceased, late of Dnepropetrovsk, U.S.S.R.; by Elena D. Eroshevskaya, administrator, ulitsa Lenina, 1a, kv. 51, Dnepropetrovsk, U.S.S.R.

[21] Appl. No.: 56,925

[22] Filed: Jul. 12, 1979

[51] Int. Cl.³ ............................................. F16F 15/22
[52] U.S. Cl. ................... 74/573 F; 73/468
[58] Field of Search ................ 74/573 R, 573 F, 574; 73/468, 66; 415/119; 210/144; 233/23 A, 1 C; 164/287; 68/23.2

[56] References Cited

U.S. PATENT DOCUMENTS

| | | | |
|---|---|---|---|
| 2,687,215 | 8/1954 | Armstrong | 74/573 F |
| 2,791,917 | 5/1957 | Kahn et al. | 74/573 F |
| 2,886,979 | 5/1959 | Baxter | 74/573 F |
| 3,597,882 | 8/1971 | Riddington | 74/573 F X |
| 3,812,724 | 5/1974 | Curtz et al. | 74/573 F X |
| 4,050,195 | 9/1977 | Hofmann | 74/573 F X |

FOREIGN PATENT DOCUMENTS

| | | | |
|---|---|---|---|
| 1026578 | 3/1958 | Fed. Rep. of Germany | 74/573 F |
| 561099 | 10/1977 | U.S.S.R. | 74/573 F |

*Primary Examiner*—Kenneth Dorner

*Attorney, Agent, or Firm*—Burton L. Lilling

[57] ABSTRACT

An apparatus for balancing bodies of revolution, according to the invention, includes distributing units mounted coaxially with a body of revolution in the measurement planes on both sides of the plane passing through the center of mass of the body of revolution perpendicular to the geometric axis thereof. The apparatus also comprises balancing tanks hydraulically connected with a liquid supply source and the distributing units and installed peripherally within the body of revolution in the correction planes on both sides of the plane passing through the center of mass of the body of revolution perpendicular to the geometric axis thereof. Each of the distributing units contains a chamber with conduits, hydraulically connected with the liquid supply source. The ends of the conduits are disposed inside said chamber and are equidistant from the geometric axis thereof. The conduits hydraulically connect the chambers with those balancing tanks which are located in the correction plane disposed on the other side of the respective measurement plane containing said distributing unit relative to the plane passing through the center of mass of the body of revolution perpendicular to the geometric axis thereof. Each balancing tank and the conduit of the distributing unit, hydraulically connected therewith, are located in the planes passing through the geometric axis of the body of revolution to form an angle within the range of 0° to 90°, defined by the plane containing the balancing tank and the plane comprising the conduit hydraulically connected therewith, which angle coincides in direction with the sense of rotation of the body of revolution.

3 Claims, 6 Drawing Figures

APPARATUS FOR BALANCING BODIES OF REVOLUTION

FIELD OF THE INVENTION

This invention relates to apparatus for balancing parts of diverse mechanisms and more particularly to apparatus for balancing bodies of revolution.

The invention can be adapted for use in the chemical, electrotechnical, metallurgical and automobile industries to offset dynamic unbalance in bodies of revolution directly in the process of operation, i.e., in the working process.

In many machines comprising bodies of revolution the initial balance of the latter attained in manufacturing these machines may be disturbed by wear and displacement of the members of the body of revolution, heating, and other causes. In the case of such machines as centrifuges, washing machines and machine tools the change in unbalance is conditioned by the working process itself. Besides, more advantageously employed at the present stage are machines whose bodies of revolution rotate at supercritical speeds, i.e., speeds at which the natural oscillation frequency of the body of revolution is less than the frequency of rotation. Bodies of revolution are generally flywheels, turbine rotors, electric motor armatures, washing machine extractors, centrifuge rotors and fan blade impellers. Very frequently geometric correlations of bodies of revolution are such that presence of an unbalanced mass on a body of revolution may be conducive to not only static but also dynamic unbalance.

DESCRIPTION OF THE PRIOR ART

The prior art automatic balancing devices functioning at supercritical speeds are capable of compensating for only static unbalance, but are inapplicable for balancing bodies of revolutions subject to dynamic unbalance generally determined as an aggregate of static and moment unbalance.

Widely known in the art is an apparatus for balancing bodies of revolution (cf. U.S. Pat. No. 2,687,215 (1954) effecting balancing thereof at subcritical speeds of rotation. Said apparatus for balancing bodies of revolution comprises balancing tanks peripherally installed within the body of revolution in two correction planes on both sides of the plane passing through the center of mass of the body of revolution perpendicular to the geometric axis thereof. Said apparatus is also provided with distributing units installed coaxially with the body of revolution in the measurement planes located on both sides of the plane passing through the center of mass of the body of revolution perpendicular to the geometric axis thereof. Each of the distributing units is a bush associated through a bearing with a housing incorporating the body of revolution and fixed thereon through movable rods which interact with the rods of the valves mounted on pipelines connected to a liquid supply source and communicating with the peripheral balancing tanks, and open the valves while radially displacing from the center to the periphery of the body of revolution.

Thus, each distributing unit located in the measurement plane controls the valves to admit the liquid from the liquid supply source into the balancing tanks located in the correction plane disposed on the same side as said measurement plane relative to the plane passing through the center of mass of the body of revolution perpendicular to the geometric axis thereof.

The aforesaid apparatus permits counteracting of dynamic unbalance of the body of revolution at subcritical speeds, i.e. when the natural oscillation frequency of the body of revolution is greater than the rotation frequency, but does not obviate the dynamic (moment and static) unbalance of the body of revolution at supercritical rotation speeds.

SUMMARY OF THE INVENTION

The principal object of the present invention is to provide an apparatus which will permit elimination of the dynamic unbalance of the body of revolution at supercritical rotation speeds.

This object is attained by an apparatus for balancing bodies of revolution, incorporating hydraulically interconnected distributing units mounted coaxially with the body of revolution in measurement planes on both sides of a plane passing through a center of mass of the body of revolution perpendicular to a geometric axis thereof, and balancing tanks hydraulically connected with a liquid supply source and fitted peripherally within the body of revolution in correction planes on both sides of the plane passing through the center of mass of the body of revolution perpendicular to the geometric axis thereof. According to the invention, hydraulically connected with the liquid supply source in each distributing unit of the apparatus is a chamber with conduits whose ends are located inside said chamber and are equdistant from the geometric axis thereof. The conduits hydraulically connect said chambers with those balancing tanks which are disposed in the correction plane located to the other side of the respective measurement plane containing said distributing unit, relative to the plane passing through the center of mass of the body of revolution perpendicular to the geometric axis thereof. Each balancing tank and the conduit of the distributing unit, hydraulically connected thereto, are located in planes passing through the geometric axis of the body of revolution to form an angle within the range of 0° to 90°, defined by the plane containing the balancing tank and the plane with the conduit hydraulically connected thereto, which angle coincides in direction with the sense of rotation of the body of revolution.

To accomplish automatic switchover of the operation modes of the apparatus for balancing bodies of revolution when changing over from subcritical to supercritical speeds, it is expedient that each of the distributing units should contain an additional chamber hydraulically connected with the liquid supply source, installed in an additional measurement plane coaxially with the body of revolution and connected with the main chamber through return valves. Conduits have ends positioned inside said additional chamber and equidistant from the geometric axis of said additional chamber, the distance between said ends and said geometric axis being less than that by which are offset from the geometric axis of the body of revolution the return valves and the ends of the conduits of the main chamber, facing thereinto. The additional chambers are hydraulically connected with those balancing tanks which are positioned in the correction plane disposed to one side of the respective additional measurement plane holding said additional chamber relative to the plane passing through the center of mass of the body of revolution perpendicular to the geometric axis thereof and also located in the plane passing through the geometric axis of the body of revolution and forming an angle within the range of 90° to 180° with the plane passing through the geometric axis of the body of revolution and containing a conduit associated therewith.

To simplify the operation of the apparatus for balancing bodies of revolution at subcritical and supercritical speeds and when changing over from subcritical to supercritical rotation speeds, it is also expedient that one of the distributing units should contain a second additional chamber directly receiving the liquid from the source of supply, secured on the shaft of the body of revolution and coupled to the other distributing unit by at least one pipeline.

BRIEF DESCRIPTION OF THE INVENTION

Other objects and advantages of the present invention will hereinafter become more fully apparent from the following detailed description of the apparatus for balancing bodies of revolution and embodiments thereof taken in conjunction with the accompanying drawings, wherein.

DETAILED DESCRIPTION OF THE INVENTION

Figure 1:
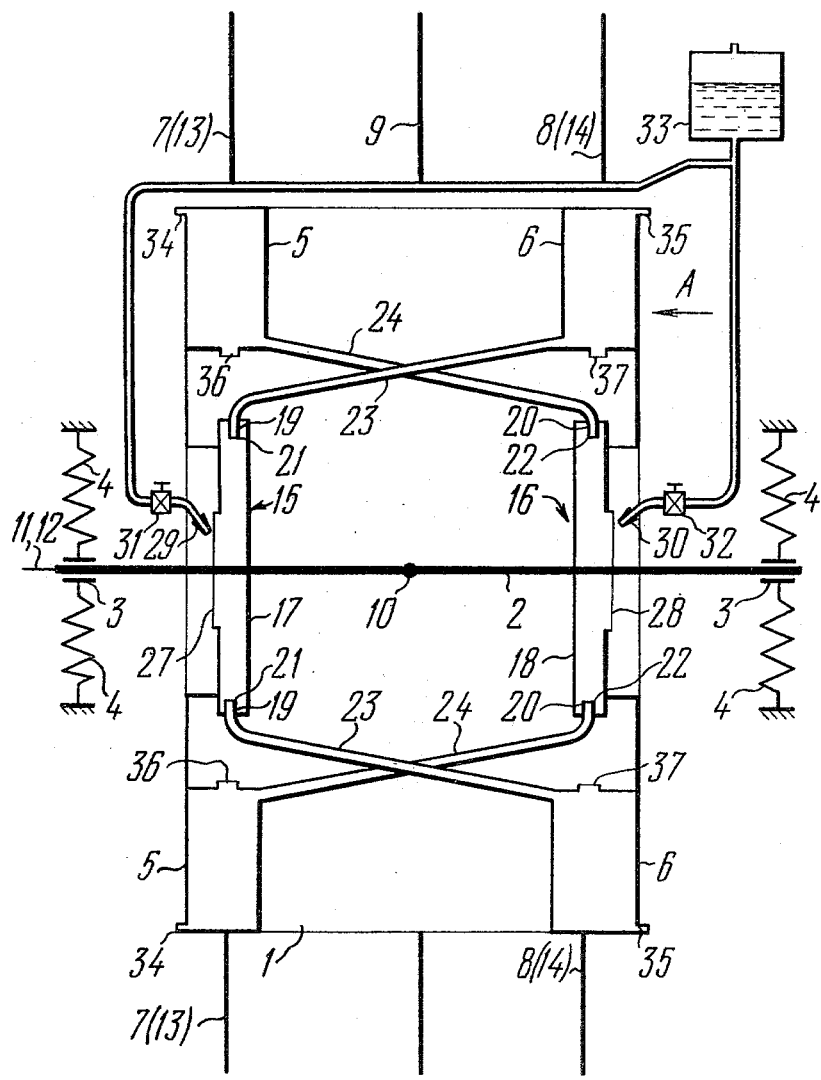
FIG. 1 is a front, elevational view of a first embodiment of an apparatus for balancing bodies of revolution, according to the invention.

An apparatus for balancing bodies of revolution according to the invention is secured on a rotor 1 (FIG. 1), which is a body of revolution whose shaft 2 is fixed in resilient braces 4 by bushes 3.

The apparatus for balancing bodies of revolution includes eight balancing tanks 5 and 6 disposed in two correction planes 7 and 8 to both sides of a plane 9 passing through a center 10 of mass of the rotor 1 perpendicular to its geometric axis coinciding with an axis 12 of the shaft 2, four balancing tanks 5 being in the correction plane 7 and four balancing tanks 6 being in the correction plane 8. Arranged coaxially with the shaft 2 of the rotor 1 in measurement planes 13 and 14 are two distributing units 15 and 16, the measurement planes 13 and 14 being located in both sides of the plane 9 passing through the center 10 of mass of the rotor 1 perpendicular to its geometric axis 11.

The distributing units 15 and 16 include chambers 17 and 18, respectively. The chamber 17 has four conduits 19, and the chamber 18 has four conduits 20. The conduits 19 terminate in ends 21 disposed inside the chamber 17 and equidistant from the geometric axis 11 of the rotor 1. The conduits 20 terminate in ends 22, disposed inside the chamber 18 and equidistant from the geometric axis 11 of the rotor 1. The conduits 19 and 20 represent pipes positioned at equally spaced intervals on the middle portion of the side surface of the chambers 17 and 18. Pipelines 23 communicate the conduits 19 of the chamber 17 located in the measurement plane 13 with the balancing tanks 6 disposed in the correction plane 8. Pipelines 24 communicate the conduit 20 of the chamber 18 located in the measurement plane 14 with balancing tanks 5 disposed in the correction plane 7.

Figure 2:
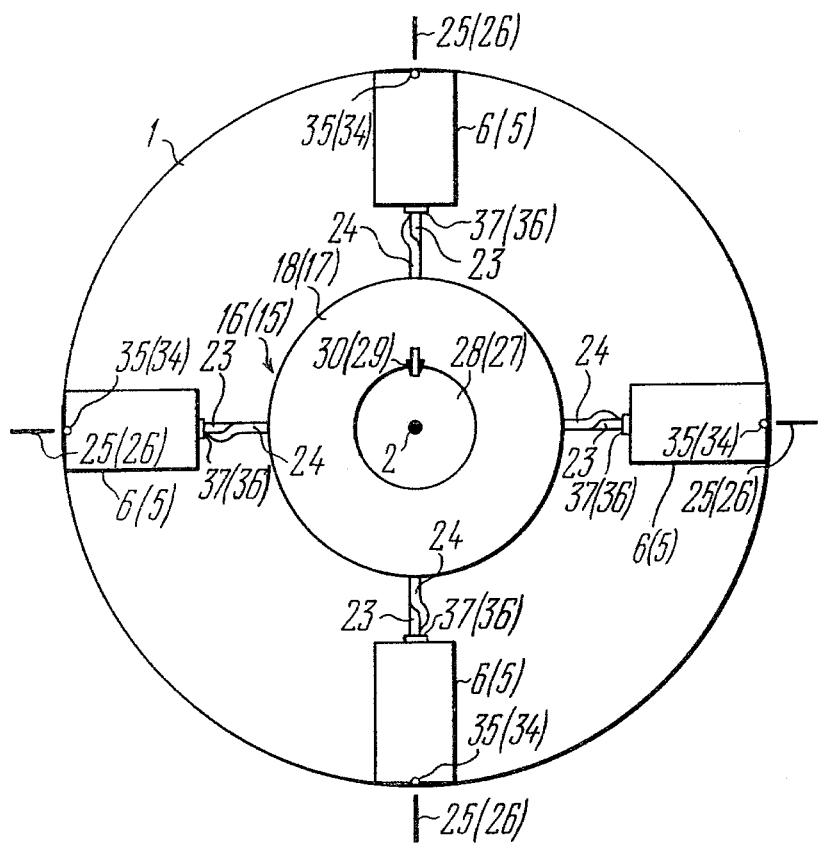
FIG. 2 shows a view of an apparatus for balancing bodies of revolution taken in the direction of arrow A of FIG. 1, according to the invention.

Each balancing tank 5 is located in a plane 25 (FIG. 2) passing through the geometric axis 11 of the rotor 1, while the conduit 19 of the chamber 17, hydraulically connected thereto by the pipeline 23, is located in a plane 26 passing through the geometric axis 11 of the rotor 1, the angle between the planes 25 and 26 comprising hydraulically interconnected balancing tank 5 and conduit 19 being equal to zero.

Each balancing tank 6 is also located in the plane 25 passing through the geometric axis 11 of the rotor 1, while the conduit 20 of the chamber 18, hydraulically connected thereto by the pipeline 24, is located in the plane 26 passing through the geometric axis 11 of the rotor 1, the angle between the planes 25 and 26 carrying hydraulically interconnected balancing tank 6 and conduit 20 being equal to zero.

In the given embodiment of the apparatus for balancing bodies of revolution the angle between the planes 25 and 26 is taken as being equal to zero, which corresponds to rotation speeds of the rotor 1 five times greater than to the critical speeds.

Considering the properties of a resilient rotary system, it follows, however, that with an external friction present the deflection vector of the rotor 1 lags behind the unbalance vector at supercritical speeds of rotation by an angle whose magnitude varies from 90° to 180°. Therefore, the angle between the planes 25 and 26 in the apparatus operating at rotation speeds approximating critical ones is taken within 0° to 90°, depending on the relation between the actual and critical rotation speeds, the aforesaid angle being reckoned from the plane 25 in the direction of the sense of rotation of the rotor 1.

Provided the angle between the planes 25 and 26 at a preset rotation speed of the rotor 1, to which speed corresponds an angle of 90° between said planes, exceeds 90°, the apparatus will introduce additional unbalance instead of counterbalancing it altogether. The angle between the planes 25 and 26 being negative in accordance with the foregoing direction of reckoning said angle, the accuracy of balancing the body of revolution by the present apparatus is reduced proportionally to the magnitude of said angle, whereas with an angle under 90° the apparatus will introduce additional unbalance.

The chambers 17 and 18 (FIG. 1) of the distributing units 15 and 16 are provided with openings 27 and 28 respectively, communicating with heads 29 and 30 hydraulically associated with a liquid supply source 33 through valves 31 and 32. The radius of the openings 27 and 28 is smaller than the distance by which are offset the ends 21 and 22 of the conduits 19 and 20 from the geometric axis 11 of the rotor 1.

To ensure discharge of liquid from the balancing tanks 5 and 6 with the change in direction of unbalance of the rotor 1, the balancing tanks 5 and 6 are provided with jets 34 and 35 selected so as to pass, during rotation, a smaller amount of liquid than the flow from the liquid supply source 33 through the heads 29 and 30. To dispose of surplus liquid from the balancing tanks 5 and 6, the balancing tanks are provided with drain holes 36 and 37, which, with the rotor 1 immobilized, are used to drain remaining liquid from the balancing tanks 5 and 6.

To ensure automatic switchover of the operation modes of the apparatus when changing over from subcritical to supercritical rotation speeds of the rotor 1, the distributing units 15 and 16 (FIG. 3) comprise additional chambers 38, 39 installed in additional measurement planes 40 and 41, respectively, coaxially with the rotor 1, and likewise disposed to both sides of the plane 9 passing through the center 10 of mass of the rotor 1 perpendicular to its geometric axis 11.

The additional chamber 38 is hydraulically connected with the main chamber 17 through a return valve 42, and the additional chamber 39 is hydraulically associated with the main chamber 18 through a return valve 43. The additional chamber 38 has four conduits 44 positioned at equally spaced intervals on the middle portion of the side surface of the additional chamber 38. The additional chamber 39 is provided with four conduits 45 equally disposed on the middle portion of the side surface of the additional chamber 39. Ends 46 of the conduits 44 are disposed inside the additional chamber 38, are equidistant from the geometric axis 11 of the rotor 1 and are offset from it by a distance less than that by which are offset from the same geometric axis 11 the return valves 42 and the ends 21 of the conduits 19 of the chambers 17. Ends 47 of the conduits 45 are housed in the additional chambers 39, are equidistant from the geometric axis 11 of the rotor 1 and are offset from it by a distance less than that by which are offset from the same geometric axis 11 the return valves 43 and the ends 22 of the conduits 20 of the chambers 18.

The conduits 44 and 45 are made in the form of pipes at equally spaced intervals on the middle portion of the side surface of the additional chambers 38 and 39.

Figure 4:
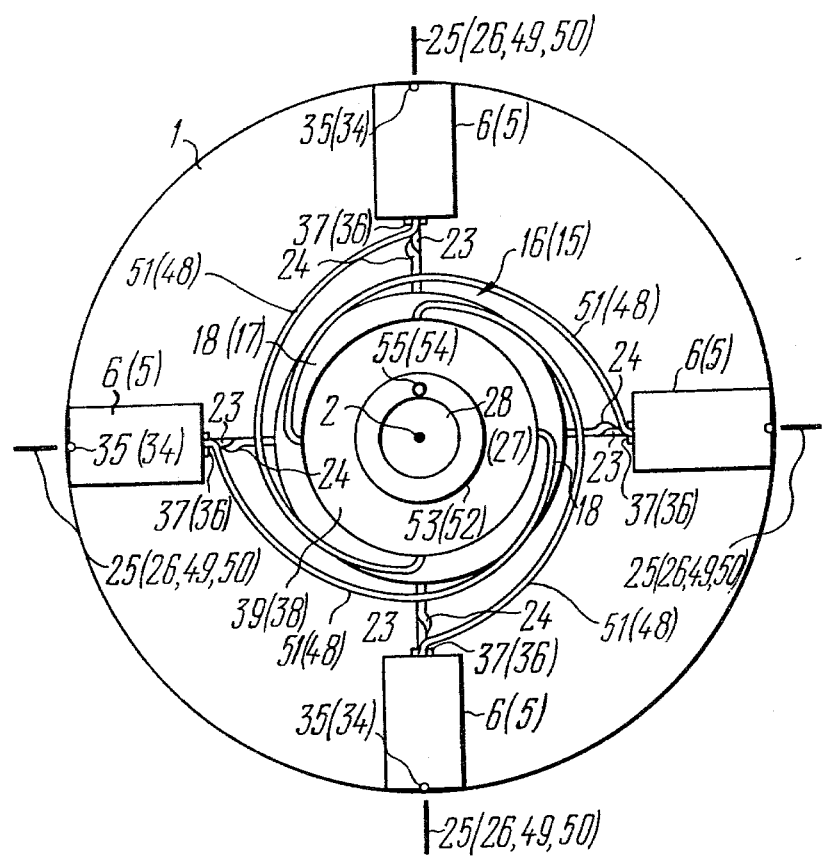
FIG. 4 shows a view of an apparatus for balancing bodies of revolution, preliminarily balanced at subcritical rotation speeds, taken in the direction of arrow B of FIG. 3, according to the invention.

The conduits 44 of the additional chamber 38 located in the additional measurement plane 40 are associated with the balancing tanks 5 arranged in the correction plane 7 by pipelines 48, the angle between planes 49 and 50 (FIG. 4) passing through the geometric axis 11 of the rotor 1 and in which are positioned, respectively, the balancing tanks 5 and hydraulically connected therewith conduits 44 of the additional chamber 38 being equal to 180°.

The conduits 45 (FIG. 3) of the additional chamber 39 located in the additional measurement plane 41 are connected with the balancing tanks 6 positioned in the correction plane 8 by pipelines 51, the angle between the planes 49 and 50 (FIG. 4) passing through the geometric axis 11 of the rotor 1 and in which are arranged, respectively, the balancing tanks 6 and hydraulically associated therewith conduits 45 of the additional chamber 39 being equal to 180°.

The additional chambers 38 and 39 (FIG. 3) have central openings 52 and 53 communicating with heads 54 and 55 hydraulically connected with a liquid supply source 58 through valves 56 and 57. The radius of the central openings 52 and 53 is smaller than the distance from the geometric axis 11 of the rotor 1 to the ends 46 and 47 of the conduits 44 and 45.

In the given embodiment of the apparatus for balancing bodies of revolution the angle between the planes 49 and 50 (FIG. 4) is equal to 180°, which corresponds to operation at subcritical speeds five times less than critical speeds of rotation.

Considering the properties of a resilient rotary system, it follows, however, that, with an external friction present, the deflection vector of the rotor 1 lags behind the unbalance vector at subcritical speeds of rotation by an angle whose magnitude, as the speed of the rotor 1 approximates a critical speed, varies within 0° to 90°.

Proceeding from this, the plane 50 must be turned, at subcritical rotation speeds of the rotor 1 close to critical ones, in the direction of the sense of rotation of the rotor 1 with respect to the plane 49 by an angle within the range of 90° to 180°, depending on the actual rotation speed of the rotor.

The angle between the planes 49 and 50 at a preset subcritical speed of rotation of the rotor 1, corresponding to which is an angle of 90°, being less than 90°, the apparatus will introduce an additional unbalance.

The angle between the planes 49 and 50 at a preset rotation speed to which corresponds an angle of 180° between the planes 50 and 51, exceeding 180°, the apparatus will balance the rotor 1 less accurately, and with an angle of 270° will introduce an additional unbalance.

It will be understood that the chambers 17 and 18 with the conduits 19 and 20 and the chambers 38 and 39 with the conduits 44, 45 of the distributing units 15 and 16 may differ in construction.

Figure 5:
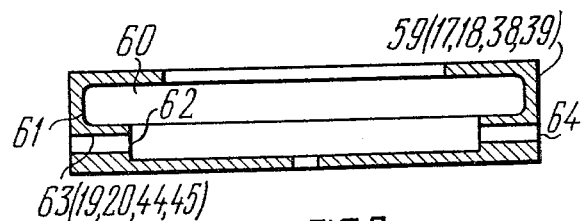
FIG. 5 is a sectional view of an embodiment of a chamber in any of the distributing units in the plane passing through the geometric axis, according to the invention.

Another embodiment of the chambers 17 and 18 and the additional chambers 38 and 39 with the conduits 19 and 20, and 44 and 45, respectively, is illustrated in FIG. 5.

In the given example the chambers 17, 18, 38 and 39 include a body 59 having an inner cavity 60 with an annular groove 61 forming an annular shoulder 62. The conduits 19, 20, 44 and 45 are made in the form of radial through holes 63 passing through the annular shoulder 62. The pipelines 23, 24, 48 and 51 are coupled to an end face 64 of the through holes 63.

To improve operation of the apparatus (see FIG. 6), the distributing unit 16 comprises a second additional chamber 65 mounted coaxially with the rotor 1 and including a hollow disk 66 with a central hole 67. The disk 66 is connected with the additional chamber 38 by a pipeline 68 at a point most distant from the axis 11 of the rotor 1. The radius of the disk 66 is less than that of the additional chamber 38. A head 69 hydraulically associated with a liquid supply source 70 by a valve 71 is brought to the central hole 67 of the second additional chamber 65, and a head 72 connected with the liquid supply source 70 by a valve 73 is brought to the opening 53 of the additional chamber 39.

The apparatus for balancing bodies of revolution operates as follows.

The rotor 1 (FIG. 1) is set rotating by a drive (not shown in the drawing). Initially, the unbalanced rotor rotates at a subcritical speed on the shaft 2 in the bushes 3 secured in the resilient braces 4. As the rotation speed increases, the rotor 1 starts rotating at supercritical speeds. Presence of unbalance causes deviation of the axis of rotation from the geometric axis 12 of the shaft 2, which coincides with the geometric axis 11 of the rotor 1.

To compensate for unbalance, the valves 31 and 32 are opened and liquid is fed from the supply source 33 through the heads 29 and 30 into the distributing units 15 and 16 installed in the measurement planes 13 and 14 to both sides of the plane 9 passing through the center 10 of mass of the rotor 1 perpendicular to its geometric axis 11. The liquid is admitted into the chambers 17 and 18 of the distributing units 15 and 16 through the openings 27 and 28. Acted upon by the centrifugal forces the liquid is flung to the periphery of the chambers 17 and 18 and, chambers 17 and 18 coaxially with the axis of rotation of the rotor 1.

As a result, the ends 21 and 22 of the conduits 19 and 20, respectively, located in the chambers 17 and 18 opposite to the displacement of the axis of rotation from the geometric axis 11 of the rotor 1, are found below the liquid level in the chambers 17 and 18.

The liquid flows through the filled up conduits 19 into the pipelines 23 and thence to the balancing tanks 6 arranged in the correction plane 8 located to the other side, relative to the plane 9, of the correction plane 13 containing the conduits 19.

From the filled up conduits 19 the liquid flows in a radial plane from the center to the periphery of the rotor 1 into the balancing tanks 6, since the conduits 19 being in the planes 26 (FIG. 2), passing through the geometric axis 11 of the rotor 1, and the balancing tanks 6 in the planes 25 passing through the geometric axis 11 of the rotor 1, said planes forming an angle of 0°.

Through the filled up conduits 20 the liquid is admitted into the pipelines 24 and returned therethrough into the balancing tanks 5 located in the correction plane 7 to the other side, relative to the plane 9, of the measurement plane 14 containing the conduits 20.

From the filled up conduits 20 the liquid flows in a radial plane from the center to the periphery of the rotor 1 into the balancing tanks 5, since the conduits 20 being located in the planes 26 passing through the geometric axis 11 of the rotor 1, and the balancing tanks 5 in the planes 25 passing through the geometric axis 11 of the rotor 1, said planes forming an angle of 0°.

Out of the balancing tanks 5 and 6 (FIG. 1) the liquid is partially drained through the jets 34 and 35. However, the heads 29 and 30 pass more liquid into the balancing tanks 5 and 6 than is drained through the jets 34 and 35, with the balancing tanks 5 and 6 filled to capacity and the rotor 1 rotating at maximum supercritical speeds, which results in the liquid accumulating in the balancing tanks 5 and 6 offsetting the unbalance, thus balancing the rotor 1. Surplus liquid is drained from the balancing tanks 5 and 6 through the drain holes 36 and 37, the axis of rotation of the rotor 1 coming into alignment with the geometric axis 11 of the rotor 1 and the geometric axis 12 of the shaft 2.

New unbalance causes another redistribution of the liquid in the chambers 17 and 18 of the distributing units 15 and 16.

The change in the position of the liquid in the chambers 17 and 18 of the distributing units 15 and 16 causes a condition where the ends 21 and 22 of the other part of the conduits 19 and 20 bypassing the liquid into the other balancing tanks 6, 5 are found below the level of liquid.

Simultaneously, the previously filled balancing tanks 5 and 6 are evacuated, because the liquid does not flow thereinto but is drained through the jets 34 and 35.

Then the rotor 1 is balanced again.

Thus, the apparatus hereinabove described ensures continuous automatic balancing of the revolving rotor 1 at substantial supercritical speeds of rotation.

Maximum removable unbalance is determined by the volume of the balancing tanks 5 and 6.

To stop the rotor, the rotation frequency is first reduced and the valves 31 and 32 closed.

At low rotation speeds, when the unbalance does not result in considerable vibration, the liquid is drained out of the balancing tanks 5 and 6 through the jets 34 and 35 and the drain holes 36 and 37, after which the rotor 1 is immobilized.

Figure 3:
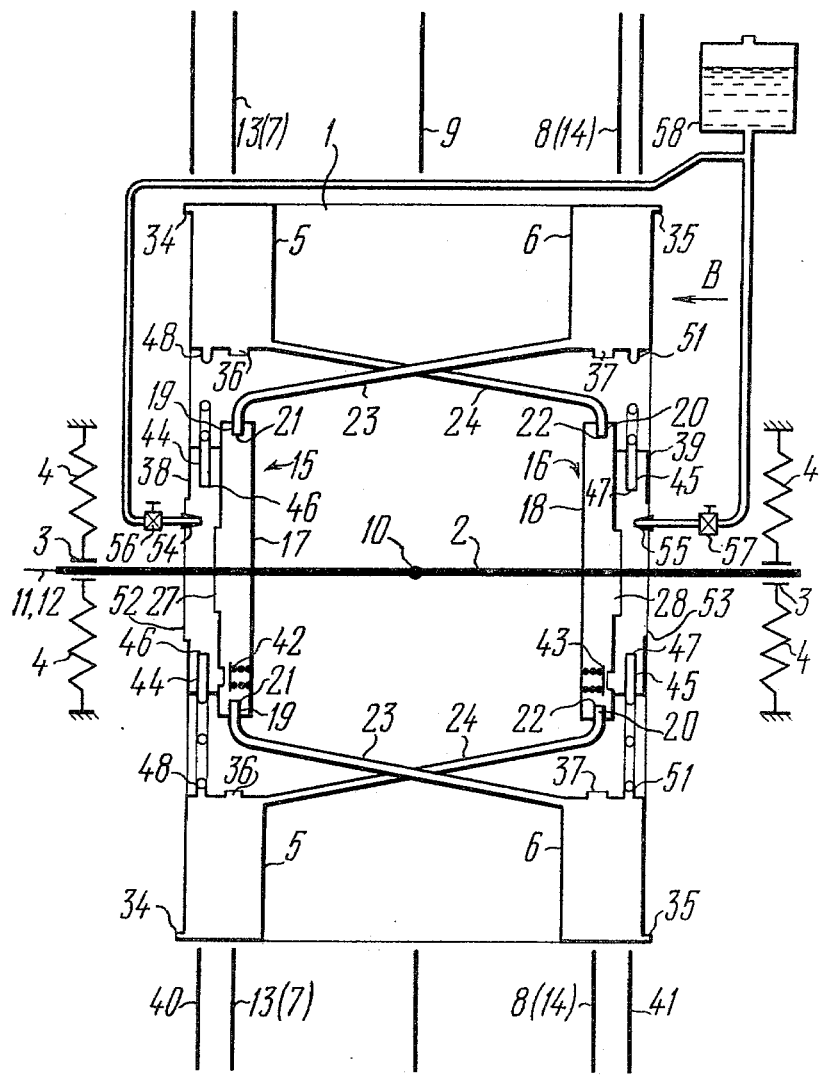
FIG. 3 is a front, elevational view of a second embodiment of an apparatus for balancing bodies of revolution, preliminarily balanced at subcritical rotation speeds, according to the invention.

The apparatus for balancing bodies of revolution presented in FIG. 3 permits preliminary balancing of the rotor 1 at subcritical rotation speeds, which facilitates the transition of the rotor 1 through the critical rotation speed and finally compensates for the unbalance at supercritical rotation speeds.

The apparatus for balancing bodies of revolution shown in FIG. 3 operates as follows.

The rotor 1 whose shaft 2 is secured in the resilient braces 4 through the bushes 3 is rotated by a drive (not shown in the drawing). After the rotor 1 has attained a subcritical rotation speed at which the resultant centrifugal forces throw the liquid to the side surface of the additional chambers 38 and 39 of the distributing units 15 and 16, the valves 57 and 56 are opened. From the liquid supply source 58 the liquid flows through the heads 54 and 55 via openings 52 and 53 into the additional chambers 38 and 39 arranged in the measurement planes 40 and 41 to both sides of the plane 9 passing through the center 10 of mass of the rotor 1. Acted upon by the centrifugal forces in the additional chambers 38 and 39, the liquid, as it accumulates, assumes an annular position coaxial with the axis of rotation of the rotor 1.

The ends 46 and 47 of the conduits 44 and 45 disposed in the additional chambers 38 and 39, opposite to the displacement of the axis of rotation of the rotor 1, are found in a position below the level of liquid in the additional chambers 38 and 39. Through the filled up conduits 44 the liquid flows into the pipelines 48 through which it is directed into the balancing tanks 5 located in the correction plane 7 disposed on the same side with the measurement plane 40 containing the additional chamber 38 with the conduits 44, relative to the plane 9 passing through the center 10 of mass of the rotor 1.

Thus, from the filled up conduits 44 the liquid passes from the center to the periphery of the rotor 1 with its flow direction changed by 180°, for the filled up conduits 44 are located in the planes 50 (FIG. 4) passing through the geometric axis 11 of the rotor 1, whereas the balancing tanks 5 connected therewith are arranged in the planes 49 passing through the geometric axis 11 of the rotor 1 to form an angle of 180° with the planes 50.

Out of the filled up conduits 45 (FIG. 3) the liquid flows through the pipelines 51 into the balancing tanks 6 arranged in the correction plane 8 which, together with the additional measurement plane 41 wherein the additional chamber 39 with the conduits 45 is located, is disposed to one side of the plane 9 passing through the center 10 of mass of the rotor 1.

Thus, from the filled up conduits 45 the liquid passes from the center to the periphery of the rotor 1, its flow direction changing by 180°, because the filled up conduits 45 are located in the planes 50 (FIG. 4) passing through the geometric axis 11 of the rotor 1, whereas the balancing tanks 6 connected therewith are arranged in the planes 49 passing through the geometric axis 11 of the rotor 1 to form an angle of 180° with the planes 50.

The liquid admitted into the balancing tanks 5 and 6 (FIG. 3) is partially drained through the jets 34 and 35. However, the heads 54 and 55 pass more liquid into the balancing tanks 5 and 6 than is drained through the jets 34 and 35 with the balancing tanks 5 and 6 filled to capacity and the rotor 1 rotating at subcritical speeds.

As a result, the liquid is accumulated in the balancing tanks 5 and 6 to balance the rotor 1. Surplus liquid is drained through the drain holes 36 and 37 from the balancing tanks 5 and 6.

Subsequently, the rotor 1 is revolved at an accelerated rate to reach supercritical rotation speeds. During the transition from subcritical to supercritical speeds a slight unbalance of the rotor 1 is not unlikely.

Therefore, the rotor 1 having attained a supercritical speed, the axis of rotation thereof deviates again from its geometric axis 11.

As the rotor 1 attains supercritical speeds under the action of the liquid column in the additional chambers 38 and 39, the return valves 42 and 43 open to pass the liquid into the chambers 17 and 18. The level of liquid in the additional chambers 38 and 39 drops to such a degree that, with the axis of rotation of the rotor 1 deviating from its geometric axis 11, the ends 46 and 47 of all conduits 44 and 45 turn out to be above the level of liquid in the additional chambers 38 and 39.

Thus, at supercritical speeds of rotation of the rotor 1 the liquid is initially admitted through the heads 54 and 55 into the additional chambers 38 and 39 and then, with the return valves 42 and 43 open, fills the chambers 17 and 18 of the distributing units 15 and 16.

The further procedure of balancing the rotor 1 at supercritical speeds is similar to that hereinabove set forth.

The embodiment of the apparatus for balancing bodies of revolution with the use of the chambers 17 and 18 and the additional chambers 38 and 39 in the form of the chamber 59 as shown in FIG. 5 functions similarly to the embodiments hereinabove described. The liquid is fed into the inner cavity 60 and fills the annular groove 61. The additionally fed liquid is bypassed from the chamber 59 via the through holes 63 in the annular shoulder 62 and flows into the pipelines 23, 24, 48 and 51 connected with the end face 64 of the through holes 63.

Figure 6:
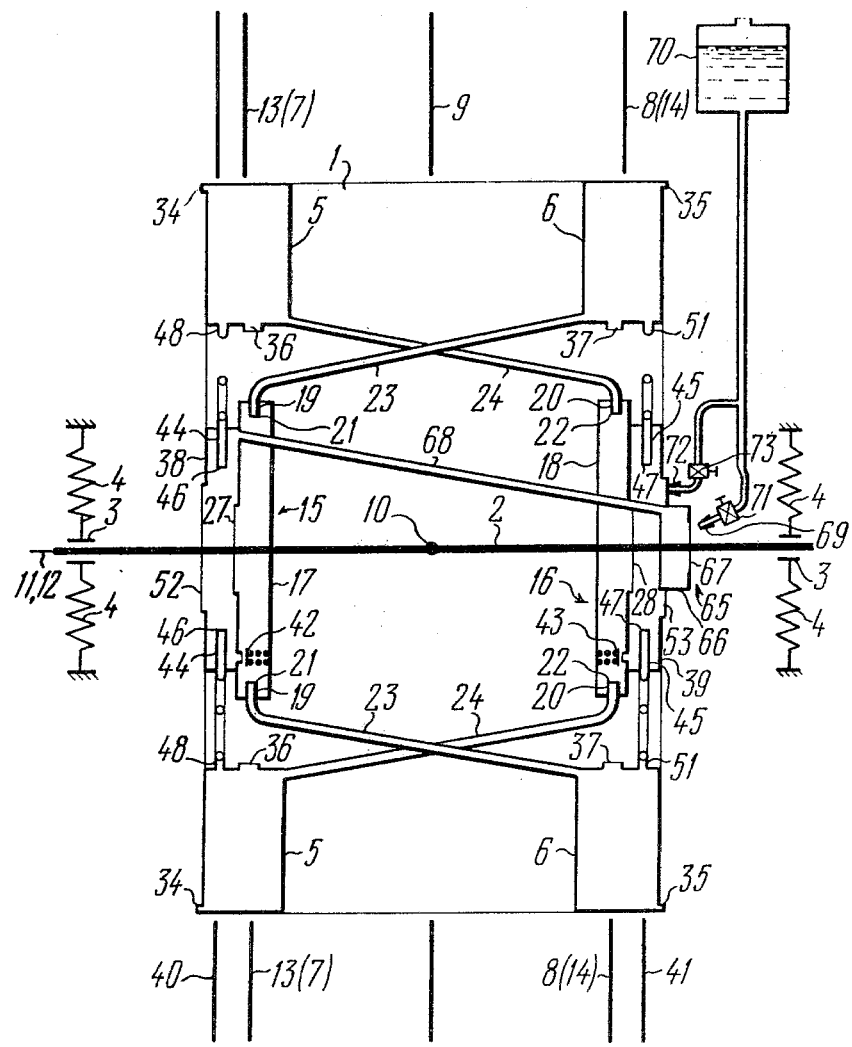
FIG. 6 is a front, elevational view of a third embodiment of an apparatus for balancing bodies of revolution, according to the invention.

The apparatus for balancing bodies of revolution illustrated in FIG. 6 operates as follows.

The rotor 1 rotates on the shaft 2 fixed in the resilient braces 4 through the bushes 3 initially at subcritical rotation speeds. The valve 71 opens to pass the liquid from the liquid supply source 70 through the head 69 into the additional chamber 65, in the form of a hollow disk 66, through the central hole 67. Thenceforth, the resultant centrifugal forces fling the liquid to the side surface of the hollow disk 66, wherefrom it is bypassed into the additional chamber 38 through the pipeline 68. Simultaneously, the valve 73 opens to bypass the liquid from the liquid supply source 70 through the head 72 into the additional chamber 39 through the central hole 53.

The further operation of the appparatus is similar to the embodiment of the apparatus for balancing bodies of revolution given in FIG. 3.

Thus, the herein disclosed apparatus for balancing bodies of revolution makes it possible to eliminate of dynamic (moment and static) unbalance of the body of revolution at supercritical rotation speeds. Furthermore, the present invention ensures dynamic balancing of the body of revolution at two and more preset rotation speeds, initially at subcritical and subsequently at supercritical rotation speeds.

A substantial advantage of the apparatus of the invention is its operability at any position of the body of revolution being balanced, and also the possibility of continuous balancing of the body of revolution at preset rotation speeds of the rotor, the unbalance changing in direction.

What is claimed is:

1. An apparatus for balancing bodies of revolution secured on a shaft, said bodies of revolution having an axis of rotation, a geometric axis and a center of mass, comprising:
    a liquid supply source;
    distributing units mounted coaxially with the body of revolution in measurement planes on both sides of a plane passing through said center of mass of said body of revolution perpendicular to the geometric axis of said body of revolution, a first chamber of each of the distributing units being installed in a first measurement plane and being hydraulically connected with said liquid supply source, conduits of said first chamber of each of the distributing units being provided in a side surface of said first chamber, and ends of said conduits being located inside said first chamber and equidistant from the geometric axis of said body of revolution;
    balancing tanks mounted peripherally within said body of revolution in correction planes on both sides of the plane passing through said center of mass of said body of revolution perpendicular to said geometric axis of said body of revolution, and hydraulically associated with said distributing units,
    each conduit of said first chamber of each of said distributing units being hydraulically associated with respective balancing tanks which are located in the correction plane to the other side of the respective measurement plane containing said distributing unit relative to the plane passing through said center of mass of said body of revolution perpendicular to said geometric axis of said body of revolution,
    each of said balancing tanks and said conduit, hydraulically associated therewith, of each of said distributing units being arranged in planes passing through said geometric axis of said body of revolution to form an angle within the range of 0° to 90°, defined by the plane containing said conduit hydraulically associated with said balancing tank, and said angle coinciding in direction with the sense of rotation of said body of revolution; and
    pipelines connecting said liquid supply source with said conduits of the first chamber of said distributing units, and connecting said first chambers of said distributing units with said balancing tanks.

2. An apparatus according to claim 1, wherein:
    each of said distributing units further includes a second chamber installed in a second measurement plane coaxially with said body of revolution and hydraulically associated with said liquid supply source, return valves of said second chamber of each of said distributing units hydraulically communicating said second chamber with said first chamber of respective distributing units, conduits of said second chamber of each of said distributing units being provided in a side surface of said second chamber, ends of said conduits of said second chamber being located inside said second chamber equidistant from the geometric axis of said second chamber, and offset from the geometric axis of said body of revolution by a distance less than the distance by which said return valves and the ends of said conduits of said first chamber, facing inside said first chamber are offset from said geometric axis of said body revolution;

said second chamber of each of said distributing units being hydraulically associated with balancing tanks located in the correction plane disposed to the same side of the respective second measurement plane containing said second chamber relative to the plane passing through said center of mass of said body of revolution perpendicular to said geometric axis of said body of revolution; and said conduit of the second chamber of each of said distributing units and the balancing tank hydraulically associated with said conduit of said second chamber are located in planes passing through said geometric axis of said body of revolution to form an angle within the range of 90° to 180°; and comprising pipelines connecting said conduits of the second chamber of each of said distributing units with said balancing tanks.

3. An apparatus for balancing bodies of revolution according to claim 2, wherein:

one of said distributing units further includes a third chamber secured on said shaft of said body of revolution, and hydraulically associated with said second chamber of the second distributing unit and with said liquid supply source; and comprising at least one pipeline hydraulically communicating said third chamber of one distributing unit with said second chamber of the other second distributing unit.

* * * * *